United States Patent [19]

Saiz

[11] Patent Number: 5,711,494
[45] Date of Patent: Jan. 27, 1998

[54] AERO-HYDROGLIDER

[76] Inventor: Manuel Munoz Saiz, San Emilio No. 16, 1-3, 28017-Madrid, Spain

[21] Appl. No.: 381,233

[22] Filed: Jan. 31, 1995

[30] Foreign Application Priority Data

Sep. 29, 1994 [ES] Spain ................... 9402042
Nov. 25, 1994 [ES] Spain ................... 9402429

[51] Int. Cl.$^6$ ................................. B64C 35/00
[52] U.S. Cl. .................... 244/12.1; 114/283; 244/105
[58] Field of Search ................... 244/100 R, 12.1, 244/36, 105, 12.4, 134 B; 114/61, 273, 274, 275, 280, 282, 283, 276, 279

[56] References Cited

U.S. PATENT DOCUMENTS

| | | | |
|---|---|---|---|
| 1,465,868 | 8/1923 | Sabey | 114/272 |
| 1,880,520 | 10/1932 | Stout | 244/134 B |
| 3,198,274 | 8/1965 | Cocksedge | 114/67 A |
| 3,762,355 | 10/1973 | Raynes | 114/273 |
| 4,613,097 | 9/1986 | Jordan | 244/12.4 |
| 4,685,641 | 8/1987 | Kirsch et al. | 244/105 |
| 5,242,132 | 9/1993 | Wukowitz | 244/12.4 |
| 5,273,238 | 12/1993 | Sato | 244/105 |

FOREIGN PATENT DOCUMENTS

| | | | |
|---|---|---|---|
| 476479 | 12/1952 | Italy | 114/272 |
| 2101046 | 1/1983 | United Kingdom | 114/272 |

*Primary Examiner*—Galen L. Barefoot
*Attorney, Agent, or Firm*—Robert M. Schwartz

[57] ABSTRACT

A hydrofoil comprising a flat vessel of aerodynamic profile which, together with small planes, produces an aerodynamic lift, and the broad base of the hull contains a set of flexible fins whose cross-sections reduce from relatively thick inner ends of relatively large cross-section to relative thin outer ends of relatively small cross-section, that are fixed at their thicker end, that are inclined toward the end opposite the forward movement of the vessel, constructed and arranged to meet the water at their large surfaces, and to generate a hydrodynamic lift, with air flow propulsion, by the, for example, propeller, turboprop, or turbofan type turbodrive engines in the upper part.

18 Claims, 9 Drawing Sheets

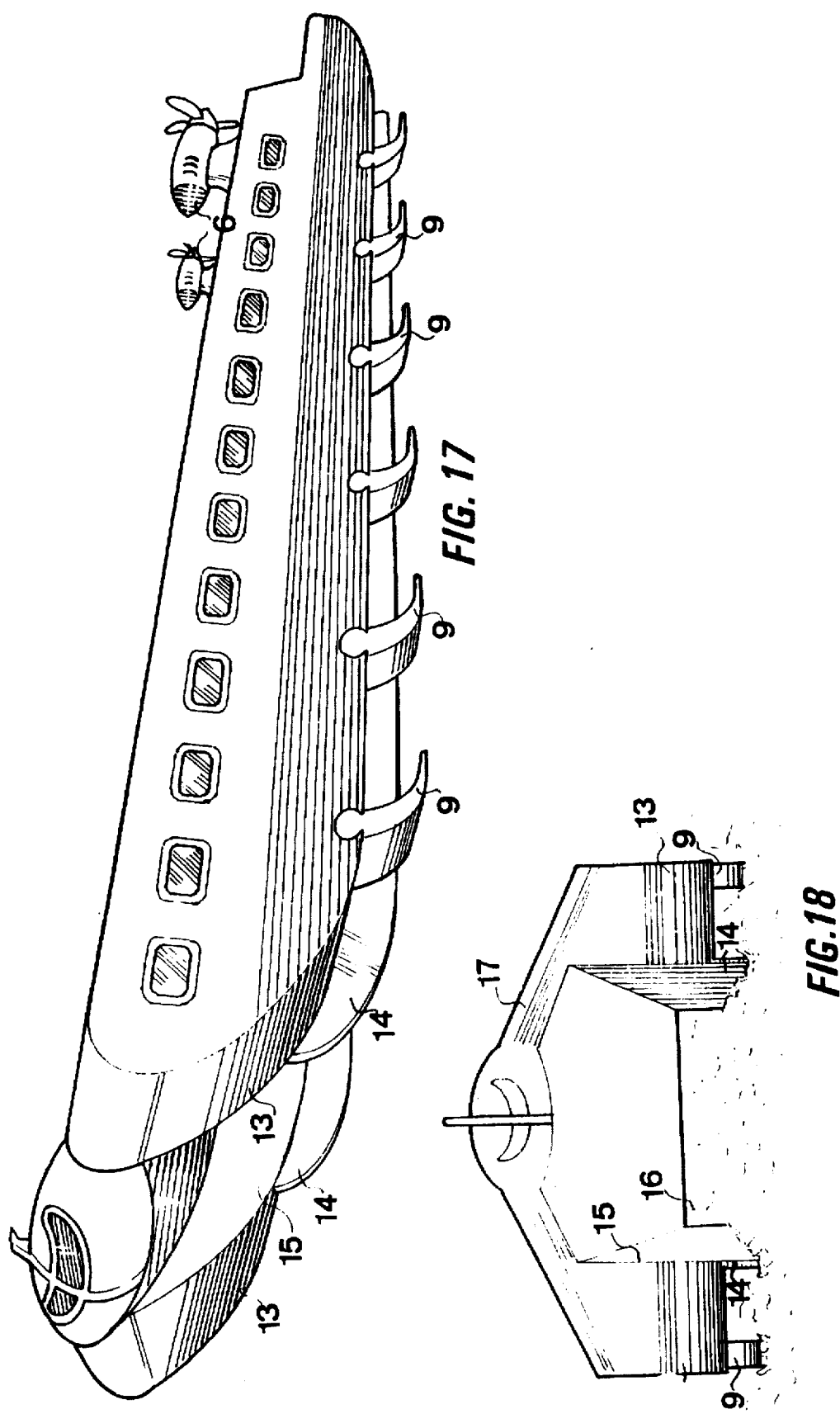

AERO-HYDROGLIDER

PRIOR APPLICATIONS

This application has previously been filed in the Spanish Patents and Trademarks Office on Nov. 25, 1994 having Serial No. 9402429 under the title HYDROFOIL, also 9402042 on Sep. 29, 1994.

BACKGROUND OF THE INVENTION

1. Field of the Invention

This invention relates to an aero-hydroglider of simple design which provides safety and high speed.

2. State of the Prior Art

There are at present hydrofoils (hydrofins or hydroplanes) consisting of a hull whose keel carries rigid wings on mounts, said wings producing hydrodynamic lift depending on whether they move forward under or on the water. The former requires a very complex height-control system to avoid waves and, with the latter, high speed travel is not possible because of the waves. Both are liable to major impacts with objects floating or submerged in the water, particularly at high speeds and especially when, in most cases, the propeller and its transmission are in the water. Cavitation is another major problem which arises. Therefore, high speeds are not possible and this in turn limits the tonnage of such hydrofoils.

DESCRIPTION OF THE INVENTION

The aero-hydroglider (aero-hydrofin or aero-hydrofoil) in this invention eliminates the above drawbacks, using mixed techniques to create lift. Aerodynamic means provide aerodynamic or primary lift, with small planes and the large area of the vessel's keel, of an aerodynamic profile shape and the associated drives, or using vertical or inclined air jets around the vessel's transverse axis and driven by one or more propeller, turboprop, or turbofan type turbo-drive engines. Hydrodynamic means generate the secondary lift, with a set of flexible extended fins whose cross-section thickness or width decreases constantly outwards. Each fin is fastened at its larger cross-section end, inclined and swept back, on the keel or lower hull, meeting the water at its surface of greater area. The lower part of the vessel is preferably flat, so that the fins are arranged in the same plane. They can also be slightly curved, similar to conventional vessels, in which case the fins may be arranged radially to the lengthwise axis, and also inclined astern. The considerable aerodynamic profile of the vessel generates most of the aerodynamic lift when the vessel is out of the water: when it moves forward underwater, it creates hydrodynamic lift. Both depend on the angle of attack and on speed.

Drive is by propeller, turboprop, and preferably turbofan type turbo-drive engines, normally installed on top of the vessel. They may be inclined slightly. It is a feature of such drive that no rigid elements are underwater and, in the case of the turbofan, that the power-weight ratio is greater as is the power. Water jet drive is also possible, with the water intake inside some of the fins or through flexible hollow pipes. Nuclear propulsion is also possible.

The directional engines gyrate mechanically, hydraulically, electrically or pneumatically.

Small planes may be used, installed at the top, similar to aircraft types, with arrow-shaped wings.

The wings may be similar to aircraft wings, albeit less extended, and installed in the upper part. One variant uses a large rectangular plane on a catamaran type vessel. This can in turn create a large pressurized chamber between the vessel and the water as the lower surface, with a large front intake and smaller stern outlet, so that the vessel creates major lift due to the ground effect when it is in movement.

The apparatus also comprises a plurality of long, flexible, straight or curved, fatigue-resistant, easily replaced fins that may be retractable or variable-extension types, hollow or floating. The fins provide variable hydrodynamic lift depending on the degree of immersion and the speed. Because there are many flexible fins, which are swept back and which sometimes glide over or just under the water surface, they are less vulnerable to impacts and waves. They act as glides or shock absorbers.

The flexible fins may be replaced with multiple rods which are also flexible and rectangular or round.

In one variant, the fins are secured to a flat or curved plate in turn fastened to the keel or hull of the vessel with aerodynamic struts.

Compact or hollow flexible wheels with radial or inclined paddles can also be mounted on the keel, in one or more groups, with a common free shaft for each so as to turn at a tangential speed equal to that of the vessel, thereby avoiding impact with floating solid objects. At very high speeds, the wheels run on the water in the same way as conventional wheels on a firm surface.

The characteristics of these systems improve with the larger vessels.

Horizontal stability, both longitudinal and lateral or transverse, is provided automatically by the most peripheral of the flexible fins, whose submergence in the water changes to create a small variable lift which rises and falls with the vessel. Longitudinal stability is also obtained with control fins operated and inclined by other fins according to their height above the water. Air or water jets directed vertically downwards can produce the same effect and can be controlled with gyroscopes and above-water height sensors. The vessel can be controlled with small fins on the planes and in the vertical fin unit, also using air jets.

The vessel is usually of flattened design, this being more aerodynamic, less subject to winds or more stable on the water. The primary lift generated by air jets suggests that the engines should be located over or close to the center of gravity, and they should turn on the transverse shaft.

Some variants enable the bow to be raised, with the rear or stern acting as a glider, dampened with the associated fins or paddle wheels.

Optionally, single wheels with retractable struts can be used. Lightweight, strong, non-corrosive materials are necessary.

OPERATION OF THE INVENTION

At rest, the vessel hull provides the lift and, as the vessel moves forward, driven by a jet of air, or water, etc., the planes and flattened body create main aerodynamic lift forces and other secondary hydrodynamic forces by means of inclined flexible and fully or partially submerged fins. The higher the speed, the greater the sum of these forces or thrusts, and they tend to raise the craft; at certain speeds it is completely out of the water when total thrust or lift comes into balance with the vessel's weight. If total lift is less than the weight, the vessel drops and the fins enter the water somewhat more, increasing the hydrodynamic lift until it equals the weight and the vessel ceases to drop. If total lift exceeds the weight, the vessel rises, as do the fins, reducing hydrodynamic lift and so the total lift, until balance is reached. This operation is completely automatic. Aerodynamic lift is also obtained by the inclined or pivot arrangement of the engines at an angle with the longitudinal axis of the vessel, so that they provide lift and propulsion at the same time. If power is increased, so increasing primary lift, the vessel could fly.

Primary lift can also be secured with direct downward flow of propeller, turboprop, or turbojet engines, which incline to simultaneously provide lift and propulsion. In this case, the use of the fins is optional. Electrically driven propellers or turbines are useful, to produce vertical air jets which stabilize the vessel horizontally with the aid of gyroscopes. This system means the hull can be less resistant.

The bow can be raised further with automatic control fins, either mechanically driven by another fin according to the distance between the vessel and the water, or by a servo-mechanism controlled by a height sensor.

The vessel can be controlled by fins operated by the ram air and/or by air impelled by the engines.

The vessel is simple and economical, capable of high speeds, is very safe, easily repaired, and useful for short and medium legs. It is simpler and faster than hovercraft, and the engines pollute less with the pulverized water.

DESCRIPTION OF THE DRAWINGS

In the accompanying drawings where like reference numbers are applied to like structural elements, possible designs are given by way of example and without limitation.

FIG. 17 shows a perspective view of another variant of the catamaran type vessel.

FIG. 18 shows a frontal profile view of the previous vessel shown in FIG. 17.

Any of the engines referred to may be used without distinction.

Figure 1:
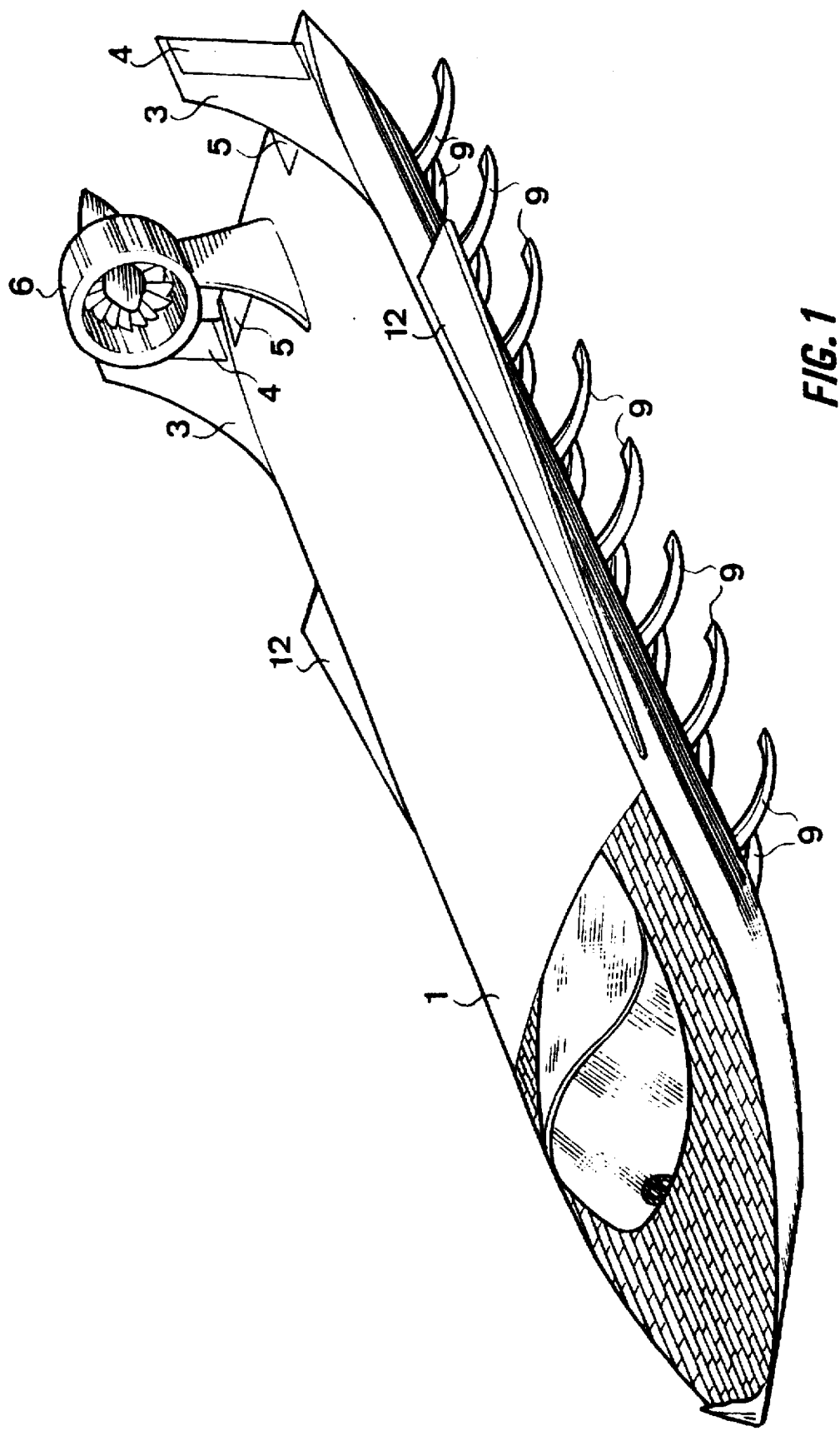
FIG. 1 shows a perspective view of a aero-hydroglider in the invention.

FIG. 1 shows the hull of a vessel 1, a pair of vertical fin units 3, rudders 4, elevators 5, a turbofan engine 6, a plurality of hydrodynamic flexible fins 9 and a pair of small planes 12. Each vertical fin unit 3 extends upward in an essentially vertical plane from an upper surface of vessel 1 and each rudder 4 is mounted about an essentially vertical axis to one or the other of the vertical fin units 3 for pivotal adjustment relative to its associated vertical fin unit 3. Each elevator 5 is mounted about an essentially horizontal axis to one lateral side or another lateral side of the longitudinal axis of the upper surface of vessel 1 for pivotal adjustment relative to said upper surface.

Figure 2:
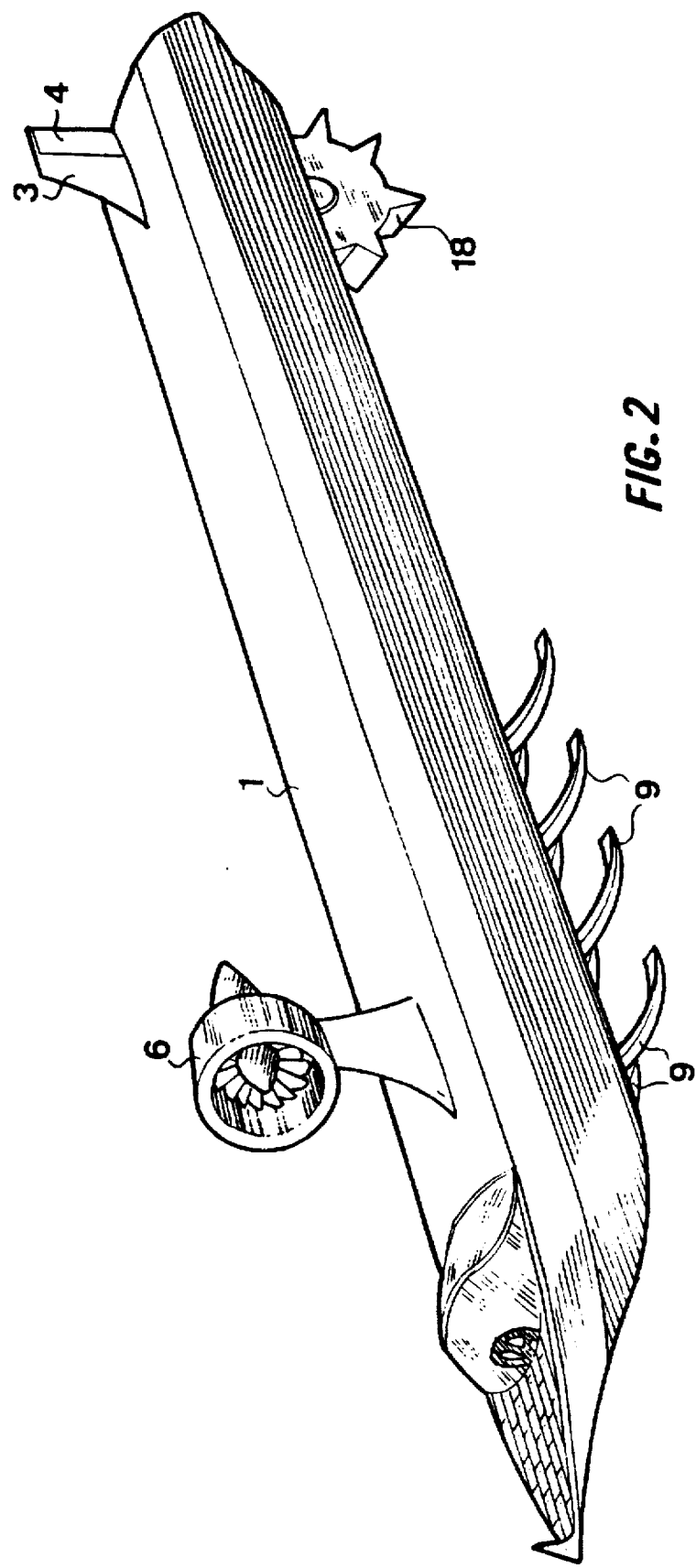
FIGS. 2 and 3 show two perspective views of two aero-hydroglider variants.

FIG. 2 shows the hull 1, having a single vertical fin unit 3, a single rudder 4, flexible fins 9, and a flexible paddle wheel 18. This arrangement shows the turbofan engine 6 on the forepart to provide more stability as it is before the vessel center.

Figure 3:
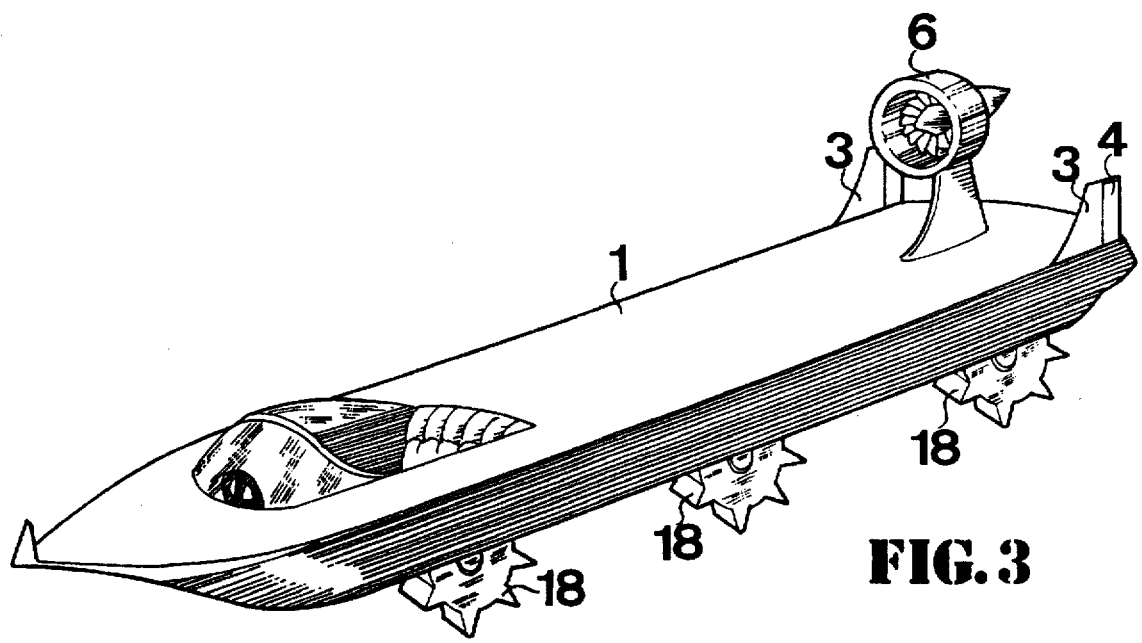

FIG. 3 shows the hull 1, a pair of fin units 3, the rudder 4, the turbofan engine 6, and multiple paddle wheels 18.

Figure 4:
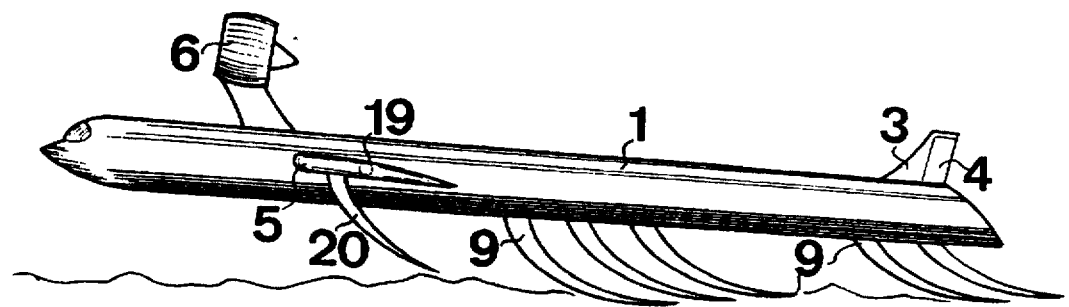
FIGS. 4 and 5 show lateral views of two aero-hydroglider variants.

FIG. 4 shows the hull 1, a single vertical fin unit 3, the rudder 4, one of a pair of elevators 5 which is operated automatically with the attached fin 20, according to the height above the water, rotating on a transverse shaft 19, the turbofan engine 6 and the flexible fins 9.

Figure 5:
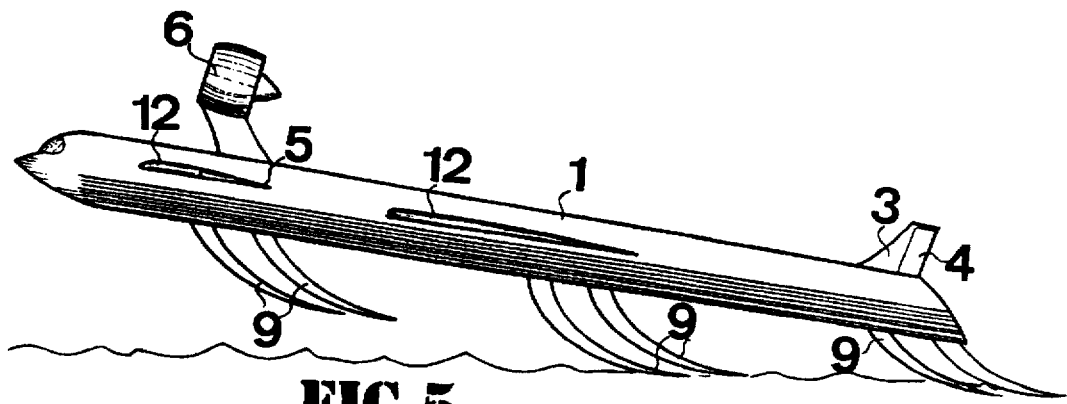

FIG. 5, similar to the vessel in FIG. 4, adds small fins 12, some attached to the elevator 5 and some attached directly to the hull 1, and shows a typical operational mode with the bow higher, supported on the rear and central fins 9, the turbofan engine 6 operating on an incline to provide traction and some lift.

Figure 6:
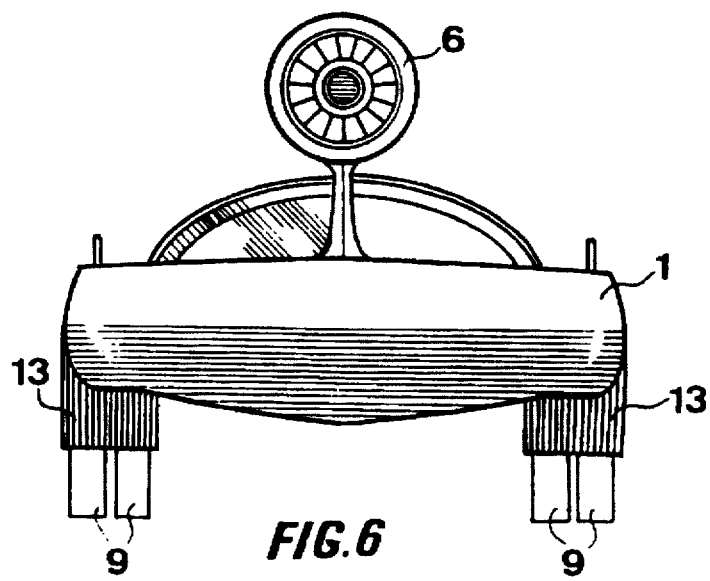
FIG. 6 shows an elevation of the stern of a catamaran type variant.

FIG. 6 shows the hull of the vessel 1 having a keel with an essentially V-shaped cross-section, the turbofan engine 6, the flexible fins 9 and a pair of lateral floats 13 to which the inner ends of certain flexible fins 9 are connected.

Figure 7:
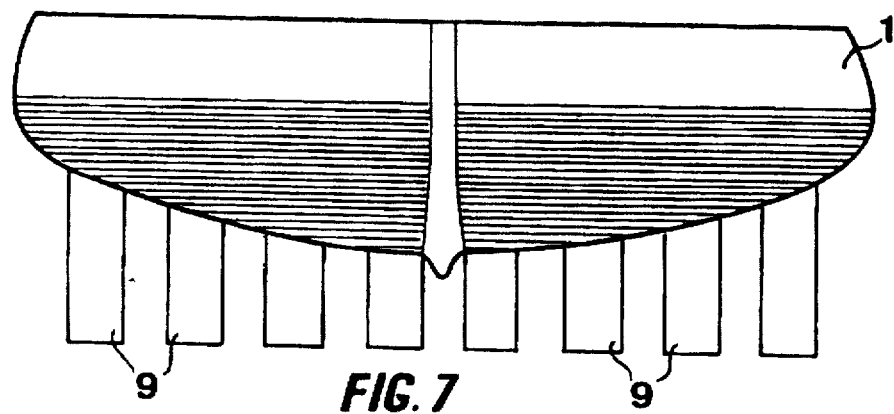
FIG. 7 shows an elevation of the stern of a vessel with a curved cross-section and radial fins of a first construction.

FIG. 7 shows the hull of the vessel 1 having a keel of essentially rounded cross-section except for a downwarldy pointed center portion, that extends axially of the vessel, and the flexible fins 9 of a first construction that end in a straight discontinuous line.

Figure 8:
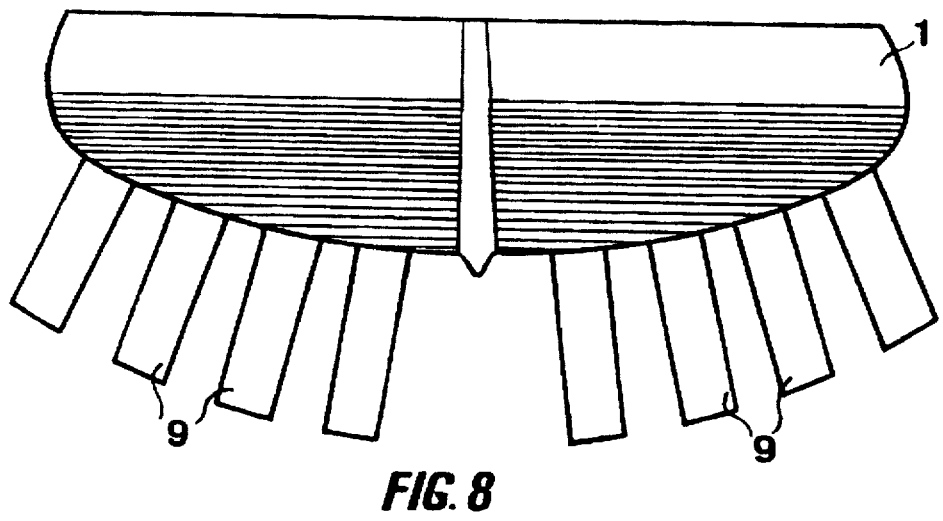
FIG. 8 shows an elevation of the stern of a vessel with a curved cross-section and radial fins of a second construction.

FIG. 8 shows the hull of the vessel 1 having a keel of essentially the same cross-section as that shown in FIG. 7 and the radial flexible fins 9 of a second construction whose outer ends form a series of short lines circumferentially spaced around a circle.

Figure 9:
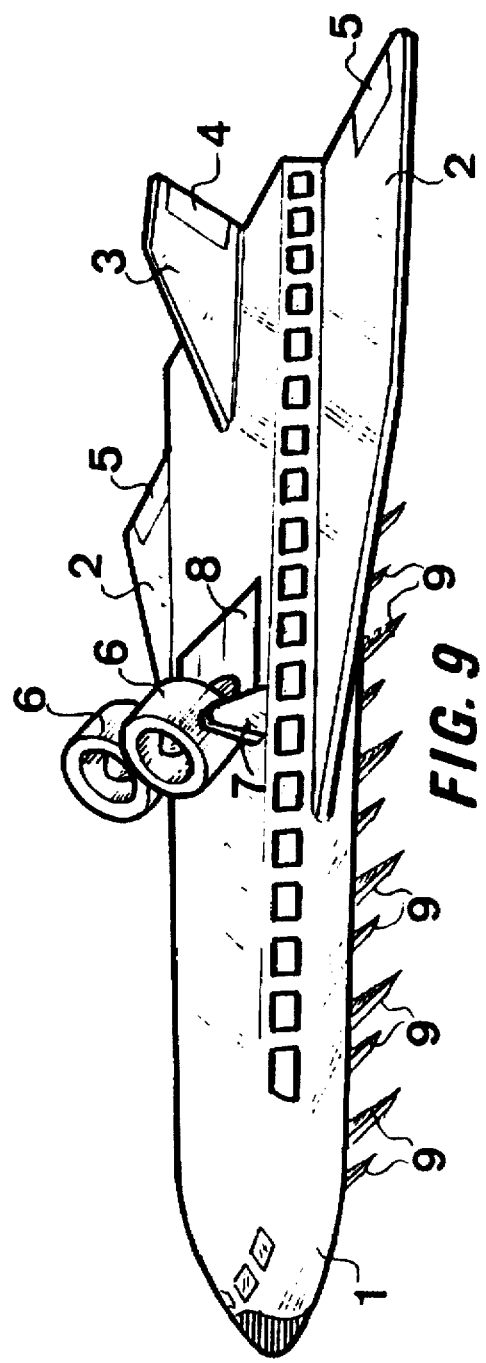
FIG. 9 shows a perspective view of the aero-hydroglider in the invention.

FIG. 9 shows the hull of the vessel 1 having transversely spaced aerodynamic planes 2, a vertical fin unit 3, a rudder 4, elevators and ailerons 5, pivotally mounted engines 6, a engine pivot shaft mount 7, a central opening 8 for gas exhaust or air flow, and flexible fins 9. The latter are arranged in sets spaced along the port side and starboard side respectively, and have relatively thick inner ends of relatively large cross-section and gradually reduce in thickness and cross-section lengthwise of each fin 9 toward its outer end. An enlarged mount head 10 is provided at the inner end of each fin 9 to facilitate attachment or bonding of each fin 9 to vessel 1. In this case, aerodynamic lift comes from the planes 2 and the aerodynamic profile of vessel 1, plus the upward thrust component of the pivotally mounted engines 6. Hydrodynamic lift comes from the flexible inclined fins 9, with propulsion from the forward thrust component of the engines 6, like the lift dependent on the angle of inclination.

Figure 10:
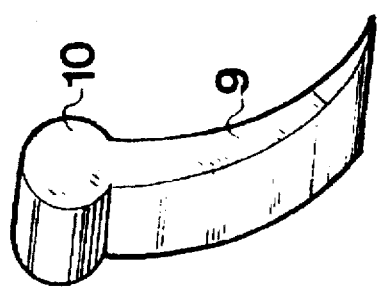

FIG. 10 shows a perspective view of a curved flexible fin 9 as such, and its mount head 10.

Figure 11:
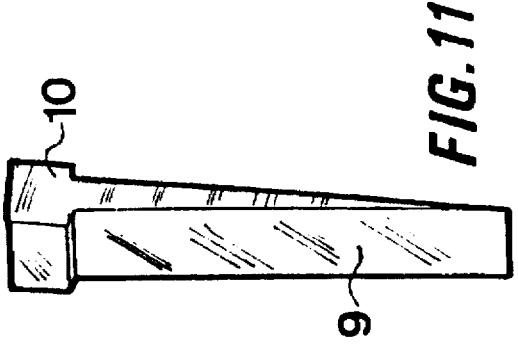
FIGS. 10 and 11 show two perspective views of two possible fin models.

FIG. 11 shows a slightly different perspective view from that of FIG. 10 of a rectilinear flexible fin 9 as such, and its mount head 10.

Figure 12:
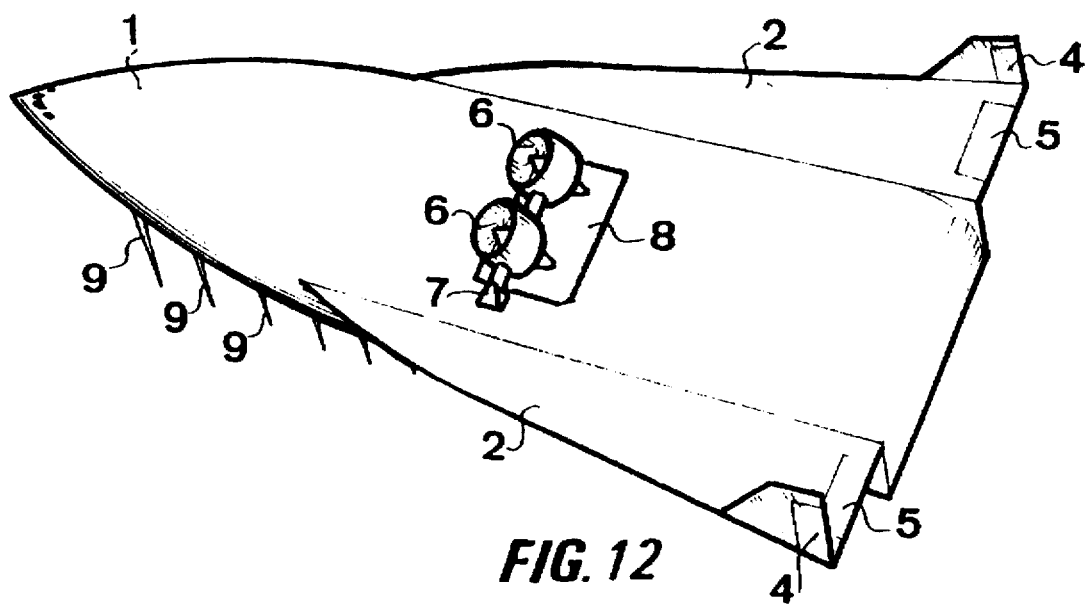
FIG. 12 shows a perspective view of an aero-hydroglider variant.
Figure 13:
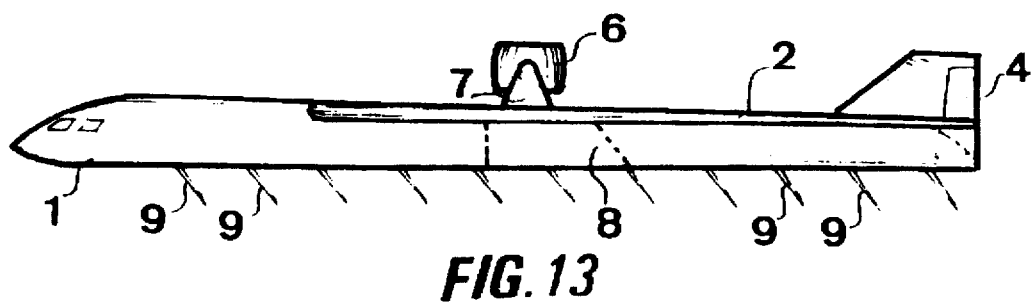
FIG. 13 shows a side view of the aero-hydrofoil shown in FIG. 12.

FIGS. 12 and 13 show hull 1, planes 2, a rudder 4 (FIG. 13) or pair of rudders 4 (FIG. 14), elevators and ailerons 5, pivotally mounted engines 6, the engine pivot shaft mount 7, the central opening 8 for gas exhaust or air flow, and flexible fins 9. Like the vessel in FIG. 1, the aerodynamic lift is produced by the planes and aerodynamic body of the vessel, and with the vertical flow of gases and air driven by the engines.

FIG. 13 shows a layout in vertical displacement or static.

Figure 14:
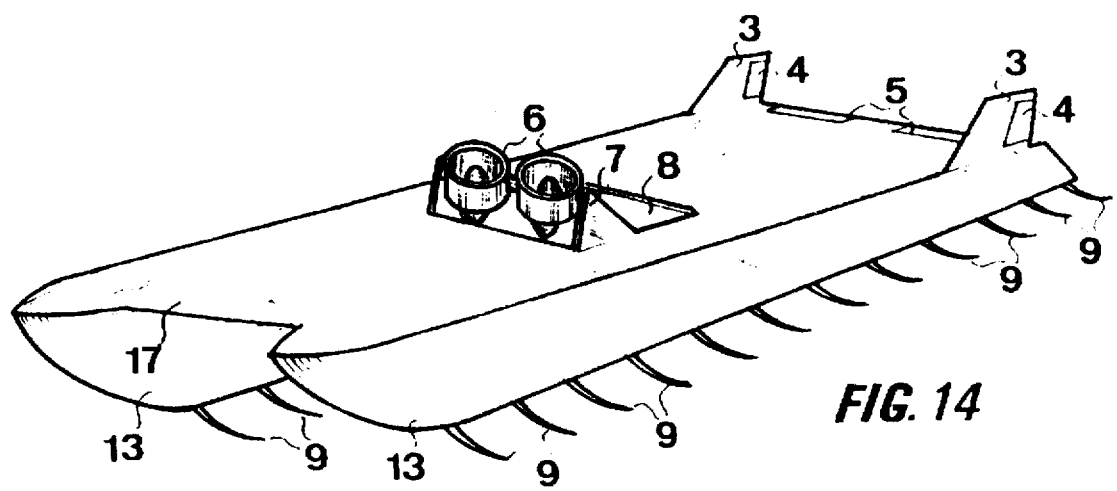
FIG. 14 shows a perspective view of a catamaran type vessel.

FIG. 14 shows a pair of vertical stabilizers 3, rudders 4, elevators 5, engines 6 pivoting on the transversal axis, the engine pivot shaft mount 7, the central opening 8 for gas exhaust or air flow, the flexible fins 9, a pair of laterally spaced hulls or floats floats 13, and a lift plane 17 linking the laterally spaced hulls or floats 13. In this system, primary lift comes from the engines and the aerodynamic surface between the hulls.

Figure 15:
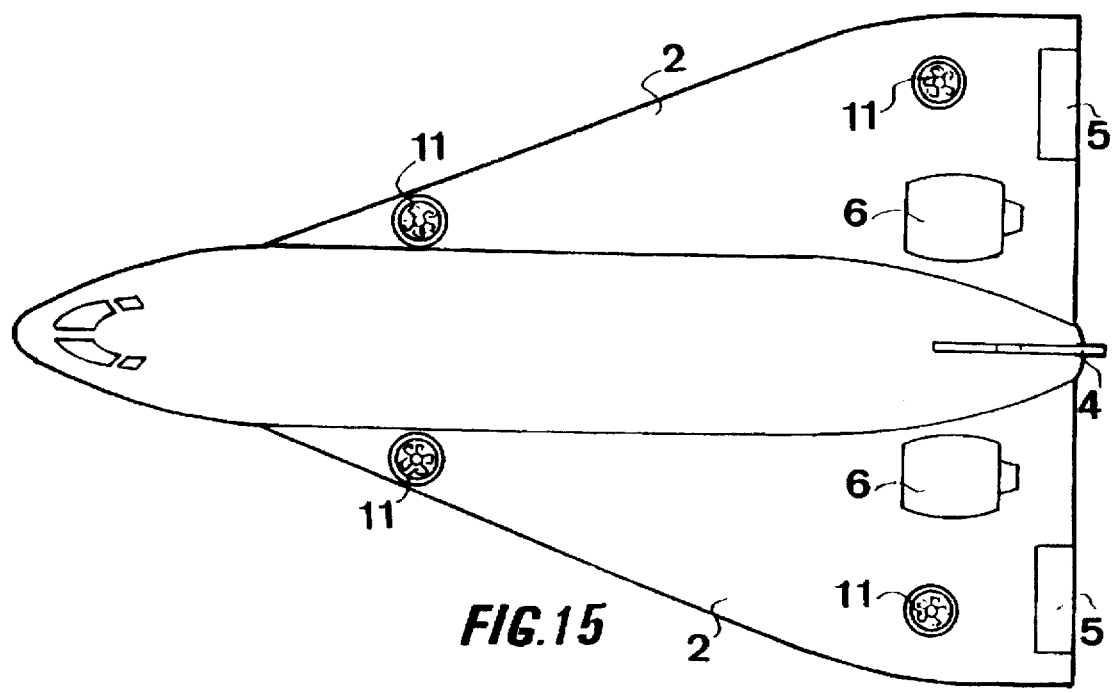
FIG. 15 shows a ground plan view of another arrangement of the system.

FIG. 15 shows planes 2, elevators and ailerons 5 and propellers or turbines 11 providing additional horizontal stability, particularly in vertical thrust systems.

Figure 16:
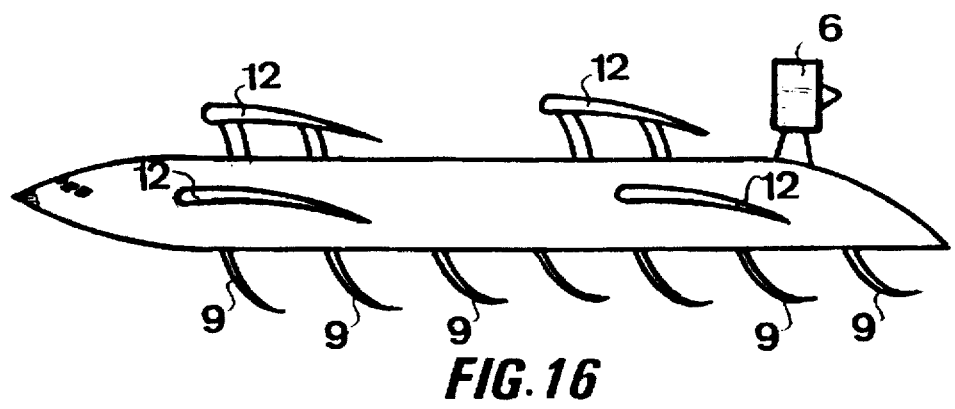
FIG. 16 shows a side view of another variant of the vessel.

FIG. 16 shows a fixed engine 6, flexible fins 9 and small planes 12. Here, the aerodynamic lift is provided by the small planes 12 and the aerodynamic profile of the vessel body.

FIGS. 17 and 18 show propeller engines 6, flexible inclined curved fins 9, lateral floats 13, lateral flexible fins 14. A relatively large intake 15, and, shown only in FIG. 18, a relatively small nozzle or outlet 16 and a lift surface or plane 17. Here aerodynamic lift is produced by the upper plane 17 and the bottom of the rest of the vessel. During forward movement, air may also enter through the larger intake 15 pressurizing the internal lower zone of the vessel between the floats 13, fins 14, plane 17 and the water surface, to create additional lift from the ground effect. The outlet is restricted by the nozzle or outlet opening 16.

Having thus described the nature of the invention and its practical design, it must be recorded that the above description may be modified in terms of detail provided that this does not alter its underlying principle.

What is claimed is:

1. An aero-hydroglider comprising a vessel in the form of a catamaran having two essentially flat hulls of aerodynamic profile having an essentially flat base, said essentially flat base of said essentially flat hull containing a set of at least three longitudinally spaced, flexible fins extending downwardly and rearwardly form each of said hulls, each of said flexible fins having relatively thick inner ends whose cross-sections reduce outwards toward relatively thin outer ends, engine means constructed an arranged relative to said vessel to generate a forward movement of said vessel, each of said fins being fixed to said vessel at its relatively thick inner end and inclined toward the end opposite said forward movement of said vessel, and means on the upper part of said vessel constructed and arranged to provide air flow propulsion relative to said vessel.

2. An aero-hydroglider as set forth in claim 1, wherein said means on the upper part of said vessel to provide air flow propulsion relative to said vessel comprised inclined engine means fixed to said vessel and constructed and arranged for pivotal adjustment relative to a transverse shaft on a roof of said vessel into an inclined orientation to impel said air flow propulsion downward and backward of said vessel when said air flow propulsion means is oriented in an operative orientation relative to said vessel.

3. An aero-hydroglider as set forth in claim 2, wherein said engine means to provide air flow propulsion is installed in the vicinity of the center of gravity of said vessel.

4. An aero-hydroglider as set forth in claim 1, wherein the inclined engine means comprise a plurality of engines distributed suitably on the top of the vessel and constructed and arranged to pivot about a transversely extending shaft mounted atop said vessel.

5. An aero-hydroglider as set forth in claim 1, wherein said flexible fins are straight.

6. An aero-hydroglider as set forth in claim 1, wherein said flexible fins are curved.

7. An aero-hydroglider as set forth in claim 1, wherein the base of said hull incorporates a set of hollow flexible wheels with essentially radial paddles, arranged in one or more groups, each group freewheeling on a common transversely extending shaft.

8. An aero-hydroglider as set forth in claim 1, wherein the vessel is in the form of a catamaran comprising two hulls with an upper plane surface linking the two hulls, lateral flexible fins to enhance the water seal, and an intake and a constricted outlet.

9. An aero-hydroglider as set forth in claim 1, wherein the flexible fins are hollow.

10. An aero-hydroglider as set forth in claim 1, further comprising small lateral planes.

11. An aero-hydroglider as set forth in claim 1, further comprising flexible fins constructed and arranged to control the elevation of the vessel over water, acting on other aerodynamic fins which rise or fall as the vessel lift varies.

12. An aero-hydroglider as set forth in claim 1, wherein the flexible fins are arranged radially to the longitudinal axis of the vessel, and swept back.

13. An aero-hydroglider as set forth in claim 1, wherein the vessel keel has a large number of flexible rods, arranged similarly to the flexible fins.

14. An aero-hydroglider as set forth in claim 1, further including electrically driven propellers constructed and arranged to serve as turbines to help stabilize the vessel.

15. An aero-hydroglider as set forth in claim 9, wherein the base of the vessel is curved like that of a conventional vessel to form a downwardly pointed, axially extending, V-shaped, transversely center portion of said hull.

16. An aero-hydroglider as set forth in claim 1, which uses control fins arranged in sets spaced along the port side and the starboard side of said vessel.

17. An aero-hydroglider as set forth in claim 13, wherein said rods have essentially rectangular cross-sections.

18. An aero-hydroglider as set forth in claim 13, wherein said rods have essentially round cross-sections.

* * * * *